(12) United States Patent
Sparks et al.

(10) Patent No.: US 9,391,897 B2
(45) Date of Patent: Jul. 12, 2016

(54) METHODS, SYSTEMS, AND COMPUTER READABLE MEDIA FOR MITIGATING TRAFFIC STORMS

(71) Applicant: Oracle International Corporation, Redwood Shores, CA (US)

(72) Inventors: Robert James Sparks, Plano, TX (US); Ben Allen Campbell, Irving, TX (US); Sam Eric McMurry, Richardson, TX (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 212 days.

(21) Appl. No.: 13/956,304

(22) Filed: Jul. 31, 2013

(65) Prior Publication Data

US 2015/0036505 A1   Feb. 5, 2015

(51) Int. Cl.
*H04L 12/801* (2013.01)
*H04L 12/911* (2013.01)
*H04L 29/06* (2006.01)

(52) U.S. Cl.
CPC ............... *H04L 47/11* (2013.01); *H04L 47/12* (2013.01); *H04L 47/746* (2013.01); *H04L 65/1073* (2013.01)

(58) Field of Classification Search
None
See application file for complete search history.

(56) References Cited

U.S. PATENT DOCUMENTS 7,522,517 B1 * 4/2009 Johnson .............. H04L 41/0663
370/221
8,468,267 B2   6/2013 Yigang et al.
(Continued)

FOREIGN PATENT DOCUMENTS

JP    2006-100873    4/2006
KR    10-2009-0029348    3/2009
(Continued)

OTHER PUBLICATIONS

Communication of European publication number and information on the application of Article 67(3) EPC for European Application No. 13776083.1 (Jan. 21, 2015).
(Continued)

*Primary Examiner* — Awet Haile
*Assistant Examiner* — Kent Krueger
(74) *Attorney, Agent, or Firm* — Jenkins, Wilson, Taylor & Hunt, P.A.

(57) ABSTRACT

Methods, systems, and computer readable media for mitigating traffic storms are provided herein. In some aspects, a system for mitigating traffic storms includes a traffic storm detector configured to detect an indication of a traffic storm. The system may also include a software defined network (SDN) controller configured to generate and send SDN commands to a controllable network entity for mitigating the traffic storm. In some aspects, a method for mitigating traffic storms includes detecting an indication of a traffic storm, wherein the traffic storm includes a burst of message traffic in a network. The method further includes sending one or more SDN commands to a controllable and/or controlled network entity to mitigate the traffic storm.

22 Claims, 3 Drawing Sheets

(56) References Cited

U.S. PATENT DOCUMENTS

| | | | |
|---|---|---|---|
| 8,601,073 | B2 | 12/2013 | Craig et al. |
| 8,665,717 | B2 | 3/2014 | Kotecha et al. |
| 8,879,431 | B2 | 11/2014 | Ridel et al. |
| 9,106,769 | B2 | 8/2015 | Kanode et al. |
| 9,240,949 | B2 | 1/2016 | McMurry et al. |
| 2003/0200277 | A1 | 10/2003 | Kim |
| 2005/0105464 | A1 | 5/2005 | Acharya et al. |
| 2006/0069776 | A1 | 3/2006 | Shim et al. |
| 2006/0090004 | A1 | 4/2006 | Nikolayev et al. |
| 2006/0268835 | A1 | 11/2006 | Hyotylainen et al. |
| 2007/0083927 | A1 | 4/2007 | Swaroop |
| 2007/0121596 | A1 | 5/2007 | Kurapati et al. |
| 2007/0153995 | A1 | 7/2007 | Fang et al. |
| 2008/0031258 | A1 | 2/2008 | Acharya et al. |
| 2008/0170497 | A1 | 7/2008 | Jeong et al. |
| 2008/0198747 | A1 | 8/2008 | Young et al. |
| 2008/0250156 | A1 | 10/2008 | Agarwal et al. |
| 2008/0253387 | A1 | 10/2008 | Liang et al. |
| 2009/0092131 | A1 | 4/2009 | Hu et al. |
| 2009/0185494 | A1 | 7/2009 | Li et al. |
| 2009/0232011 | A1 | 9/2009 | Li et al. |
| 2010/0030914 | A1 | 2/2010 | Sparks et al. |
| 2010/0071035 | A1 | 3/2010 | Budko et al. |
| 2010/0103861 | A1 | 4/2010 | Ulupinar et al. |
| 2010/0125477 | A1 | 5/2010 | Mousseau et al. |
| 2010/0211956 | A1 | 8/2010 | Gopisetty et al. |
| 2010/0217850 | A1 | 8/2010 | Ferris |
| 2010/0299451 | A1 | 11/2010 | Yigang et al. |
| 2011/0016467 | A1 | 1/2011 | Kane |
| 2011/0040845 | A1 | 2/2011 | Cai et al. |
| 2011/0061061 | A1 | 3/2011 | Chen et al. |
| 2011/0090900 | A1* | 4/2011 | Jackson et al. ............... 370/352 |
| 2011/0116382 | A1 | 5/2011 | McCann et al. |
| 2011/0171958 | A1 | 7/2011 | Hua et al. |
| 2011/0200053 | A1 | 8/2011 | Kanode et al. |
| 2011/0202676 | A1 | 8/2011 | Craig et al. |
| 2011/0299395 | A1 | 12/2011 | Mariblanca Nieves |
| 2012/0044867 | A1 | 2/2012 | Faccin et al. |
| 2012/0087368 | A1 | 4/2012 | Kunarathnam et al. |
| 2012/0123870 | A1 | 5/2012 | Denman et al. |
| 2012/0131165 | A1 | 5/2012 | Baniel et al. |
| 2012/0140665 | A1 | 6/2012 | Li et al. |
| 2012/0155389 | A1 | 6/2012 | McNamee et al. |
| 2012/0203781 | A1 | 8/2012 | Wakefield |
| 2012/0221445 | A1 | 8/2012 | Sharma |
| 2012/0221693 | A1 | 8/2012 | Cutler et al. |
| 2012/0300615 | A1 | 11/2012 | Kempf et al. |
| 2012/0303796 | A1 | 11/2012 | Mo et al. |
| 2012/0303835 | A1* | 11/2012 | Kempf et al. ............... 709/235 |
| 2012/0307631 | A1 | 12/2012 | Yang et al. |
| 2013/0019277 | A1 | 1/2013 | Chang et al. |
| 2013/0039176 | A1 | 2/2013 | Kanode et al. |
| 2013/0044645 | A1 | 2/2013 | Castro Castro et al. |
| 2013/0086279 | A1 | 4/2013 | Archer et al. |
| 2013/0124712 | A1 | 5/2013 | Parker |
| 2013/0163429 | A1 | 6/2013 | Dunstan et al. |
| 2013/0188489 | A1* | 7/2013 | Sato ............... 370/235 |
| 2013/0223219 | A1* | 8/2013 | Mir ............... H04L 47/11 370/232 |
| 2013/0250770 | A1 | 9/2013 | Zou et al. |
| 2013/0263208 | A1 | 10/2013 | Challa |
| 2013/0275583 | A1 | 10/2013 | Roach et al. |
| 2014/0026231 | A1 | 1/2014 | Barak et al. |
| 2014/0059678 | A1 | 2/2014 | Parker |
| 2014/0189137 | A1 | 7/2014 | Castro Castro et al. |
| 2014/0192646 | A1* | 7/2014 | Mir et al. ............... 370/235 |
| 2014/0204796 | A1 | 7/2014 | Bantukul |
| 2014/0310388 | A1 | 10/2014 | Djukic et al. |
| 2014/0376380 | A1 | 12/2014 | Campbell et al. |
| 2015/0036486 | A1 | 2/2015 | McMurry et al. |
| 2015/0036504 | A1 | 2/2015 | McMurry et al. |
| 2015/0085663 | A1 | 3/2015 | McMurry et al. |
| 2015/0142940 | A1 | 5/2015 | McMurry et al. |
| 2015/0149656 | A1 | 5/2015 | McMurry et al. |
| 2015/0215228 | A1 | 7/2015 | McMurry |

FOREIGN PATENT DOCUMENTS

| | | |
|---|---|---|
| WO | WO 2009/070179 A1 | 6/2009 |
| WO | WO 2009/129487 A2 | 10/2009 |
| WO | WO 2011/161575 A1 | 12/2011 |
| WO | WO 2012/063106 A1 | 5/2012 |
| WO | WO 2012/100092 A2 | 7/2012 |
| WO | WO 2012/119147 A1 | 9/2012 |
| WO | WO 2012/130264 A1 | 10/2012 |
| WO | WO 2012/149954 A1 | 11/2012 |
| WO | WO 2013/155535 A1 | 10/2013 |
| WO | WO 2015/041750 A1 | 3/2015 |
| WO | WO 2015/077377 A1 | 5/2015 |
| WO | WO 2015/080906 A1 | 6/2015 |
| WO | WO 2015/116449 A1 | 8/2015 |

OTHER PUBLICATIONS

Commonly-assigned, co-pending International Application No. PCT/US15/12250 for "Methods, Systems, and Computer Readable Media for a Cloud-Based Virtualization Orchestrator," (Unpublished, filed Jan. 21, 2015).

Commonly-assigned, co-pending International Application No. PCT/US14/66469 for "Methods, Systems, and Computer Readable Media for a Network Function Virtualization Information Concentrator," (Unpublished, filed Nov. 19, 2014).

Commonly-assigned, co-pending International Application No. PCT/US14/66240 for "Methods, Systems, and Computer Readable Media for Diameter Routing Using Software Devine Network (SDN) Functionality," (Unpublished, filed Nov. 18, 2014).

Notification of Transmittal of the International Search Report and the Written Opinion for of the International Searching Authority, or the Declaration for International Application No. PCT/US2014/048651 (Nov. 17, 2014).

Notification of Transmittal of the International Search Report and the Written Opinion of the International Searching Authority, or the Declaration for International Application No. PCT/US2014/048644 (Oct. 17, 2014).

Non-Final Office Action for U.S. Appl. No. 13/749,655 (Sep. 3, 2014).

Commonly-assigned, co-pending International Application No. PCT/US14/48651 for "Methods, Systems, and Computer Readable Media for Diameter Load and Overload Information and Virtualization," (Unpublished, filed Jul. 29, 2014).

Notification of Transmittal of the International Search Report and the Written Opinion of the International Searching Authority, or the Declaration for International Application No. PCT/US2014/011551 (Apr. 28, 2014).

Commonly-assigned, co-pending U.S. Appl. No. 14/166,790 for "Methods, Systems, and Computer Readable Media for a Cloud-Based Virtualization Orchestrator," (Unpublished, filed Jan. 28, 2014).

Commonly-assigned, co-pending International Application No. PCT/US14/11551 for "Methods, Systems, and Computer Readable Media for Using Policy Knowledge of or Obtained by a Policy and Charging Rules Function (PCRF) for Needs Based Forwarding of Bearer Session Traffic to Network Nodes," (Unpublished, filed January.

Commonly-assigned, co-pending U.S. Appl. No. 14/086,950 for "Methods, Systems, and Computer Readable Media for a Network Function Virtualization Information Concentrator," (Unpublished, filed Nov. 21, 2013).

Commonly-assigned, co-pending U.S. Appl. No. 14/034,478 for "Methods, Systems, and Computer Readable Media for Diameter Load and Overload Information and Virtualization," (Unpublished, filed Sep. 23, 2013).

Tschofenig, "Diameter Overload Architecture and Information Model," draft-tschofenig-dime-overload-arch-00.txt, DIME, pp. 1-9 (Jul. 16, 2013).

Notification of Transmittal of the International Search Report and the Written Opinion of the International Searching Authority, or the Declaration for International Application No. PCT/US2013/036664 (Jul. 2, 2013).

(56) References Cited

OTHER PUBLICATIONS

Campbell, "Diameter Overload Control Solution Issues," draft-campbell-dime-overload-issues-00, pp. 1-16 (Jun. 2013).
"3rd Generation Partnership Project; Technical Specification Group Core Network and Terminals; Study on Diameter overload control mechanisms (Release 12)," 3GPP TR 29.809 V0.3.0, pp. 1-51 (Jun. 2013).
Roach et al., "A Mechanism for Diameter Overload Control," draft-roach-dime-overload-ctrl-03, DIME, pp. 1-49 (May 17, 2013).
Korhonen et al., "The Diameter Overload Control Application (DOCA)," draft-korhonen-dime-ovl-01.txt, Diameter Maintenance and Extensions (DIME), pp. 1-18 (Feb. 25, 2013).
Fajardo et al., "Diameter Base Protocol," RFC 6733, pp. 1-152 (Oct. 2012).
McMurry et al., "Diameter Overload Control Requirements," draft-ietf-dime-overload-reqs-00, pp. 1-25 (Sep. 21, 2012).
"OpenFlow Switch Specification," https://www.opennetworking.org/images/stories/downloads/sdn-resources/onf-specifications/openflow/openflow-spec-v1.2.pdf, Version 1.2 (Wire Protocol 0x03), Open Networking Foundation, pp. 1-85 (Dec. 5, 2011).
Interview Summary for U.S. Appl. No. 12/425,998 (Sep. 14, 2011).
Final Office Action for U.S. Appl. No. 12/425,998 (Jun. 8, 2011).
Interview Summary for U.S. Appl. No. 12/425,998 (Mar. 1, 2011).
"OpenFlow Switch Specification," Version 1.1.0 Implemented (Wire Protocol 0x02), www.openflow.org, pp. 1-56 (Feb. 28, 2011).
Non-Final Office Action for U.S. Appl. No. 12/425,998 (Nov. 29, 2010).
Notification of Transmittal of the International Search Report and the Written Opinion of the International Searching Authority, or the Declaration for International Application No. PCT/US2009/041006 (Dec. 4, 2009).
"Introduction to Evolved Packet Core," White Paper, Alcatel-Lucent, 11 pgs. (2009).
Hilt, et al., "Session Initiation Protocol (SIP) Overload Control," IETF, draft-hilt-sipping-overload-02, p. 1-28 (Jul. 8, 2007).
Zhang, et al., "Denial of Service Attack Prevention on SIP VoIP Infrastructures Using DNS Flooding," in Principles, Systems, and Applications of IP Telecummunications (IPTCOMM) (Jul. 2007).
Nahum, et al., "Evaluating SIP Server Performance,"IBM T.J. Watson Research Center, RC24183 (Feb. 2007).
Rosenberg, J., "Requirements for Management of OVerload in the Session Initiation Protocol," IETF, draft-rosenbergy-sipping-overload-reqs-02, p. 1-22 (Oct. 2006).
Kuthan, et al., "Denial of Service Attacks Targeting a SIP VoIP Infrastructure: Attack Scenarios and Prevention mechanims," IEEE Networks Magazine, vol. 20, No. 5 (Sep. 2006).
Ohta, M., "Overload Protection in a SIP Signaling Network," in International conference on Internet Surveillance and Protection (ICISP), p. 1-6 (2006).
Donovan, et al., "Session Timers in the Session Initiation Protocol (SIP)," Network Working Group, RFC 4028 (Apr. 2005).
Ohta, M., "Simulation Study of SIP Signaling in an Overload Condition," International Conference for Communications, Internet, and Information Technology, IASTED/ACTA Press, pp. 321-326 (Nov. 22-24, 2004).
Calhoun et al., "Diameter Base Protocol," RFC 3588, pp. 1-147 (Sep. 2003).
Rosenberg, et al., "SIP: Session Initiation Protocol," Network Working Group, RFC 3261, http://www.ietf.org/rfc/rfc3261.txt, p. 1-252 (Jun. 2002).
Schulzrinne, et al., "SIPstone—Benchmarking SIP Server Performance," (Apr. 2002).
"Signaling Flows for the IP Multimedia Call control Based on Session Initiation Protocol (SIP) and Session Description Protocol (SDP)," 3GPP TS 24.228 V1.1.0, p. 1-653 (Jul. 3-6, 2001).
Grossglauser, et al., "On the Relevance of Long-Range Dependence in Network Traffic," IEEE/ACM Transactions on Networking, vol. 7, No. 5, p. 629-640 (Oct. 1999).
Notification of Transmittal of the International Search Report and the Written Opinion of the International Searching Authority, or the Declaration for the International Application No. PCT/US2014/066240 (May 13, 2015).
Non-Final Office Action for U.S. Appl. No. 13/956,307 (Apr. 23, 2015).
Notice of Allowance and Fee(s) Due and Examiner-Initiated Interview Summary for U.S. Appl. No. 13/572,156 (Apr. 6, 2015).
Non-Final Office Action for U.S. Appl. No. 13/956,300 (Apr. 8, 2015).
Final Office Action for U.S. Appl. No. 13/749,655 (Apr. 3, 2015).
Notification of Transmittal of the International Search Report and the Written Opinion of the International Searching Authority, or the Declaration for PCT International Application No. PCT/US2015/012250 (Mar. 31, 2015).
Non-Final Office Action for U.S. Appl. No. 13/863,351 (Mar. 27, 2015).
Non-Final Office Action for U.S. Appl. No. 14/034,478 (Mar. 23, 2015).
Notification of Transmittal of the International Search Report and the Written Opinion of the International Searching Authority, or the Declaration for International Application No. PCT/US2014/066469 (Feb. 20, 2015).
Final Office Action for U.S. Appl. No. 13/572,156 (Dec. 29, 2014).
Non-Final Office Action for U.S. Appl. No. 13/572,156 (May 23, 2014).
"Network Function Virtualization (NFV) Management and Orchestration," ETSI, Group Specification, GS NFV-MAN 001 V0.0.11, pp. 1-74 (Oct. 18, 2013).
"Split Architecture for Large Scale Wide Area Networks," SPARC ICT-258457 Deliverable D3.3, pp. 1-129 (Dec. 1, 2011).
3GPP, "Digital Cellular Telecommunications System (Phase 2+); Universal Mobile Telecommunications System (UMTS); Universal Subscriber Identity Module (USIM) Application Toolkit (USAT) (3GPP TS 31.111 version 8.3.0. Release 8)," ETSI TS 131 111 V8.3.0, pp. Jan. 1-102 (Oct. 2008).
Extended European Search Report for European Application No. 13804779.0 (Jan. 19, 2016).
Advisory Action Before the Filing of an Appeal Brief and AFCP 2.0 Decision for U.S. Appl. No. 13/917,200 (Jan. 14, 2016).
Applicant-Initiated Interview Summary for U.S. Appl. No. 14/092,898 (Jan. 14, 2016).
Non-Final Office Action for U.S. Appl. No. 14/313,610 (Jan. 11, 2016).
Non-Final Office Action for U.S. Appl. No. 13/749,655 (Dec. 31, 2015).
Applicant-Initiated Interview Summary for U.S. Appl. No. 14/182,864 (Dec. 16, 2015).
Extended European Search Report for European Application No. 13776083.1 (Dec. 14, 2015).
Non-Final Office Action for U.S. Appl. No. 14/086,950 (Dec. 4, 2015).
Supplemental Notice of Allowability for U.S. Appl. No. 13/956,300 (Dec. 1, 2015).
Advisory Action for U.S. Appl. No. 13/863,351 (Nov. 25, 2015).
Advisory Action for U.S. Appl. No. 14/034,478 (Nov. 17, 2015).
Final Office Action for U.S. Appl. No. 13/956,307 (Nov. 5, 2015).
Communication of European Publication Number and Information on the Application of Article 67(3) EPC for European Patent Application No. 14703974.7 (Nov. 4, 2015).
Notice of Allowance and Fee(s) Due & Examiner-Initiated Interview Summary for U.S. Appl. No. 13/956,300 (Oct. 23, 2015).
Non-Final Office Action for U.S. Appl. No. 14/092,898 (Oct. 8, 2015).
Final Office Action for U.S. Appl. No. 13/863,351 (Sep. 11, 2015).
Final Office Action for U.S. Appl. No. 14/034,478 (Sep. 8, 2015).
Advisory Action Before the Filing of an Appeal Brief, Examiner-Initiated Interview Summary and AFCP 2.0 Decision for U.S. Appl. No. 13/749,655 (Jul. 24, 2015).
Applicant-Initiated Interview Summary for U.S. Appl. No. 13/956,300 (Jun. 29, 2015).

(56) References Cited

OTHER PUBLICATIONS

Commonly-assigned, co-pending U.S. Appl. No. 14/720,412 for "Methods, Systems, and Computer Readable Media for Short and Long Term Policy and Charging Rules Function (PCRF) Load Balancing," (Unpublished, filed May 22, 2015).

Commonly-assigned, co-pending U.S. Appl. No. 14/692,710 for "Methods, Systems, and Computer Readable Media for Multi-Layer Orchestration in Software Defined Networks (SDNs)," (Unpublished, filed Apr. 21, 2015).

"Multi-Protocol Routing Agent User Guide," Policy Management, 910-6648-001 Revision A, pp. 1-70 (Mar. 2013).

Kempf et al., "Moving the Mobile Evolved Packet Core to the Cloud," 2012 Fifth International Workshop on Selected Topics in Mobile and Wireless Computing, pp. 1-8 (Oct. 8, 2012).

"Multi-Protocol Routing Agent User Guide," Policy Management, 910-6404-001 Revision A, pp. 1-70 (Jun. 2012).

Li Erran et al., "CellSDN: Software-Defined Cellular Networks," ftp://ftp.cs.princeton.edu/techeports/2012/922.pdf, pp. 1-6 (Apr. 20, 2012).

* cited by examiner

METHODS, SYSTEMS, AND COMPUTER READABLE MEDIA FOR MITIGATING TRAFFIC STORMS

TECHNICAL FIELD

The subject matter described herein relates to mitigating traffic storms. More particularly, the subject matter described herein relates to mitigating traffic storms via software defined network (SDN) commands communicated to controllable network entities.

BACKGROUND

A traffic storm is a flurry or burst of message traffic in a network, which may overwhelm network resources and/or cause the network to fail. One example of a traffic storm is when a large number of internet protocol (IP) phones attempt to simultaneously register with the network after a power outage. Another example of a traffic storm is when a software bug at a network registrar results in deregistration and simultaneous re-registration of mobile devices.

One strategy for mitigating the effects of a traffic storm is to statically provision firewalls to limit or throttle access to the overwhelmed and/or protected network resource. Another strategy is to statically provision or throttle traffic to the overwhelmed network resource. Using statically provisioned resources to handle traffic storms is undesirable because the protection devices themselves may be overwhelmed or inadequate to handle the traffic storm.

Accordingly, there exists a need for methods, systems, and computer readable media for dynamically mitigating traffic storms, using, for example, using software defined networks (SDNs) to provide flexible, scalable alternate resources when traffic storms are detected.

SUMMARY

The subject matter described herein includes methods, systems, and computer readable media for mitigating traffic storms. In some embodiments, a system for mitigating traffic storms includes a traffic storm detector configured to detect an indication of a traffic storm. The system may also include a software defined network (SDN) controller configured to generate and send SDN commands to a controllable network entity for mitigating the traffic storm.

In some embodiments, a method for mitigating traffic storms includes detecting an indication of a traffic storm, wherein the traffic storm includes a burst of message traffic in a network. The method further includes sending one or more SDN commands to a controllable and/or controlled network entity to mitigate the traffic storm.

In some embodiments, SDN commands communicated from an SDN controller can partition traffic based upon a class of traffic, an emergency indicator (e.g., an emergency attribute value pair (AVP) encoded within a payload of a message), a destination, an address, an IP prefix, an IP address, one or more QoS rules, or one or more policy rules.

The subject matter described herein may be implemented in software in combination with hardware and/or firmware. For example, the subject matter described herein may be implemented in software executed by one or more hardware processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to an addressable entity in a network. A node may be all or a portion of a physical computing platform, such as a server with one or more hardware processor blades or a single processor blade that implements a function, such as a router, a switch, a home subscriber server (HSS), a mobility management entity (MME), a policy and charging rules function (PCRF), an application function (AF), a subscription profile repository (SPR), etc. A node may include one or more hardware processors and memory for executing and storing instructions for implementing the node's particular function. A node may also be a virtual entity implemented by one or more processor blades.

As used herein the term "controller" refers to all or a portion of a physical computing platform adapted to control one or more nodes and/or establish routing paths using one or more nodes via rules provided and/or stored therein. A controller may include one or more hardware processors and memory for executing and storing instructions and/or rules for implementing at a node using a communication protocol communicated via a port or logical interface. The controller may communicate with a client to instruct the client how and where to route packets. A controller may also control and/or establish one or more virtual entities implemented by one or more processor blades.

As used herein, the term "user device" describes subscriber or user equipment, such as a mobile handset, for communicating with one or more portions of a network. User devices may also include a computer, a pager, a smartphone, a phone, a wireless modem, a computing platform, a mobile handset, other subscriber devices and/or combinations thereof.

As used herein, the term "network", when referring to a home, visited, and/or an alternate network, includes any one of a 3G network, a 3G+ network, a GSM network, a 4G network, an LTE network, an evolved packet core (EPC) network, a 3rd Generation Partnership Project (3GPP) network, a GPRS core network, an IMS core, or other suitable type of network.

As used herein, the term "software defined network" or SDN refers to the physically decoupling of network control plane hardware from the data forwarding plane hardware such that an addressable node (e.g., a switch) can forward packets and a separate server (e.g., a SDN controller) can run the network control plane.

As used herein, the term "OpenFlow" describes a communication protocol defined according to OpenFlow version 1.2, available at https://www.opennetworking.org/images/stories/downloads/sdn-resources/onf-specifications/openflow/openflow-spec-v1.2.pdf, which gives access to the forwarding plane of a node (e.g., a network switch or router) over the network. As used herein an "OpenFlow controller" refers to a control device, including a hardware processor and memory, configured to communicate with one or more network components via the OpenFlow protocol.

BRIEF DESCRIPTION OF THE DRAWINGS

Preferred embodiments of the subject matter described herein will now be explained with reference to the accompanying drawings, of which.

DETAILED DESCRIPTION

In accordance with the subject matter disclosed herein, systems, methods, and computer readable media for mitigating traffic storms are provided. Notably, some embodiments of the present subject matter described herein may include establishing or creating alternate networks, such as software defined networks (SDNs), for managing traffic and preventing one or more network components from being flooded and/or overloaded with traffic. In some embodiments, traffic may be offloaded to one or more alternate resources until the overwhelmed network can recover and/or sustain the amount of traffic initially requested. In other embodiments, the traffic offloaded to alternate resources may be permanent.

In some embodiments, a stand-alone control device or SDN controller and/or a control device integrated with one or more existing network components may be configured to detect or receive an indication of a traffic storm, and instruct one or more controllable network entities to mitigate the storm by allocating additional resources and/or creating alternate resources for routing traffic thereto. Notably, methods systems, and computer readable media described herein may include mitigating traffic storms prior to the traffic reaching an ingress node, or edge device of a network. Thus, traffic may be dynamically re-routed to alternate resources before entering and/or overwhelming a destination network.

In some embodiments, subject matter described herein includes provision of a locally managed or operated control device or controller, configured to move network control out of proprietary network switches and/or routers. For example, the locally managed controller may include a SDN controller having computer readable medium stored thereon for executing instructions for pushing one or more SDN commands to one or more network components (e.g., switches or routers) via an interface, such as a SDN interface or an OpenFlow interface. The one or more network components may then route traffic to one or more alternate resources and/or create alternate resources as instructed by the controller.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
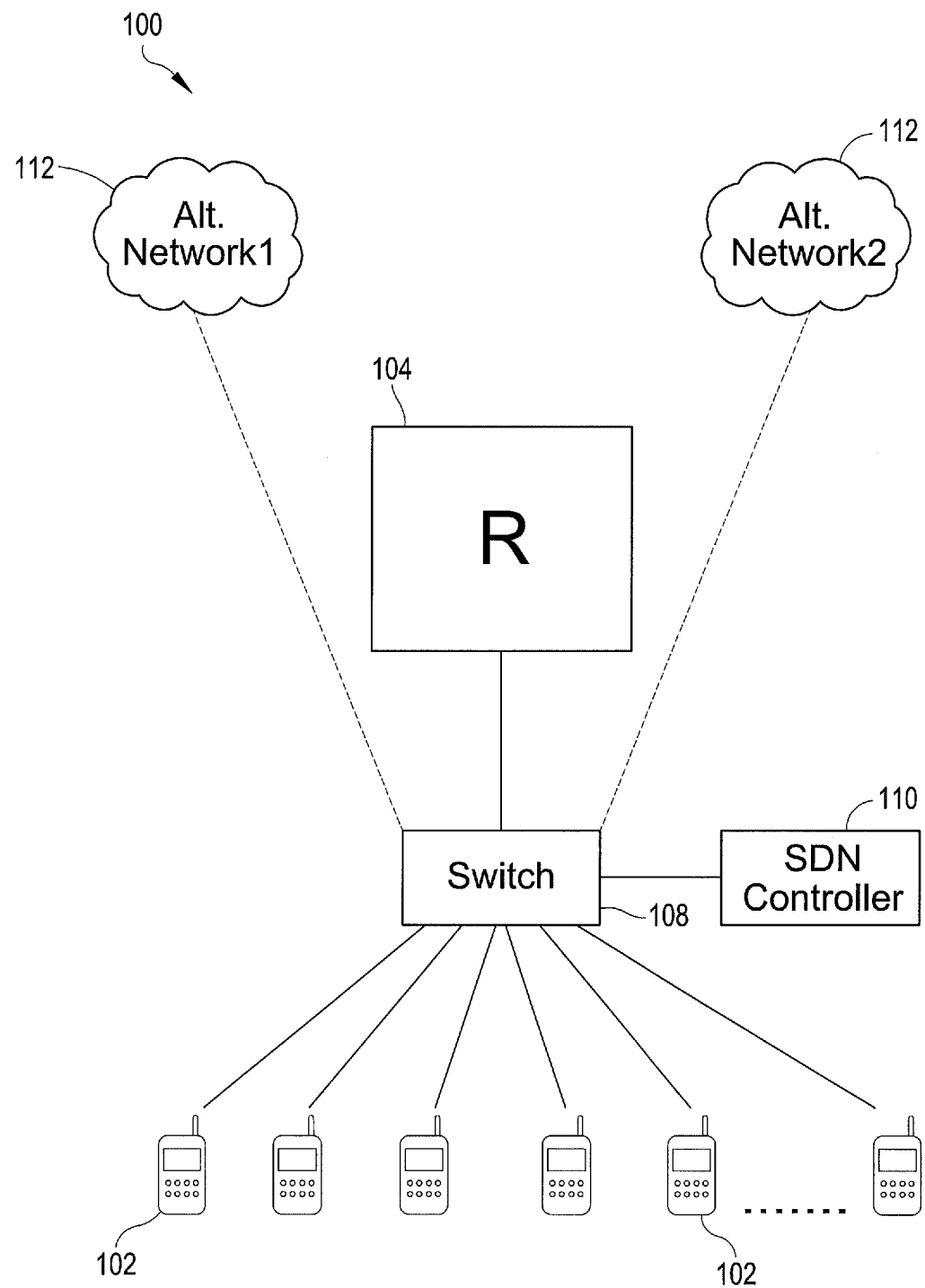
FIGS. 1, 2A and 2B are network diagrams illustrating network components for mitigating traffic storms according to embodiments of the subject matter described herein.

In FIG. 1, a network, generally designated 100, for mitigating traffic storms is provided. Network 100 may include a plurality of user devices 102. In some embodiments, the plurality of user devices 102 are attempting to simultaneous register with a registration node 104. In one embodiment, registration node 104 may include a SIP registrar. In some embodiments, hundreds, thousands, or even hundreds of thousands of user devices 102 may be simultaneously signaling registration node 104. The large quantity (e.g., more than 100, more than 200, more than 500, more than 1,000, more than 2,000 subscriber devices) of user devices 102 attempting to simultaneous signal and/or otherwise register with node 104 may collectively form a traffic storm which would typically overwhelm node 104. However, network 100 advantageously includes a controllable entity or switch 108 and a SDN controller 110 for mitigating the effects of the traffic storm.

Notably and in some embodiments, SDN controller 110 and switch 108 may be configured to dynamically create or establish alternative routing paths or SDNs for offloading some or all of the incoming traffic signaled via user devices 102. In other embodiments, SDN controller 110 may instruct switch 108 to offload traffic to one or more alternate entities, such as a server, to delay, quiet, and/or stall some or all of the traffic before it can reach the intended registration node 104. Traffic may be offloaded using the one or more alternate routing paths and/or SDNs to mitigate a storm. Notably, switch 108 may be instructed by SDN controller 110 to implement, create, and/or establish switching paths to alternate resources for mitigating the traffic storm prior to the storm overwhelming registration node 104.

In some embodiments, SDN controller 110 may include a traffic storm detector configured to detect a traffic storm and send SDN commands to a controlled network entity, such as switch 108, in response to detecting a storm. Although a switch is illustrated in FIG. 1, the controlled network entity may also include a router, an access point (e.g. a WiFi access point), an ingress node, a signaling gateway, and/or any other addressable node that handles network traffic. Switch 108 may be configured to use routing rules to allow a portion of the traffic to reach registration node 104, while offloading other portions to one or more alternate resources including alternate networks 112 and/or alternate resources. In some embodiments, traffic may be offloaded to such alternate resources permanently, or only until registration node 104 may handle the load.

Notably, SDN controller 110 and switch 108 may collectively be configured to dynamically create or establish alternate networks 112. For illustration purposes only two alternate networks 112 are shown, however, only one or more than two alternate networks 112 may also be provided and are contemplated herein. Alternate networks 112 may include SDNs that are "virtual networks" until dynamically established and implemented to receive packets. Alternate networks 112 may be dynamically established as needed for dynamically re-routing traffic about the congested network node (e.g., registration node 104) according to SDN commands communicated from SDN controller 110 at the onset of a traffic storm. Establishing SDNs is advantageous as it obviates a need to manually configure hardware, and allows network administrators to provision and/or program SDN controller 110 with instructions or routing rules for dealing with traffic, without requiring physical access to network-specific hardware devices.

In some embodiments, alternate networks 112 include dynamically created networks. In other aspects, alternate networks 112 include one or more pre-existing networks offered by an alternate carrier.

In some embodiments, SDN controller 110 may push one or more routing rules and/or SDN commands to switch 108 via a controller to switch interface. In some embodiments, the controller to switch interface includes an OpenFlow interface configured to communicate via OpenFlow protocol. In some embodiments, SDN controller 110 implements OpenFlow protocol for controlling one or more OpenFlow switches, routers, or nodes.

In some embodiments, SDN commands communicated via SDN controller 110 may be configured to partition traffic based upon a class of traffic, an emergency indicator (e.g., an emergency AVP encoded within a payload of a message), a destination, an address, an IP prefix, an IP address, one or more QoS rules, or one or more policy rules.

Figure 2A:
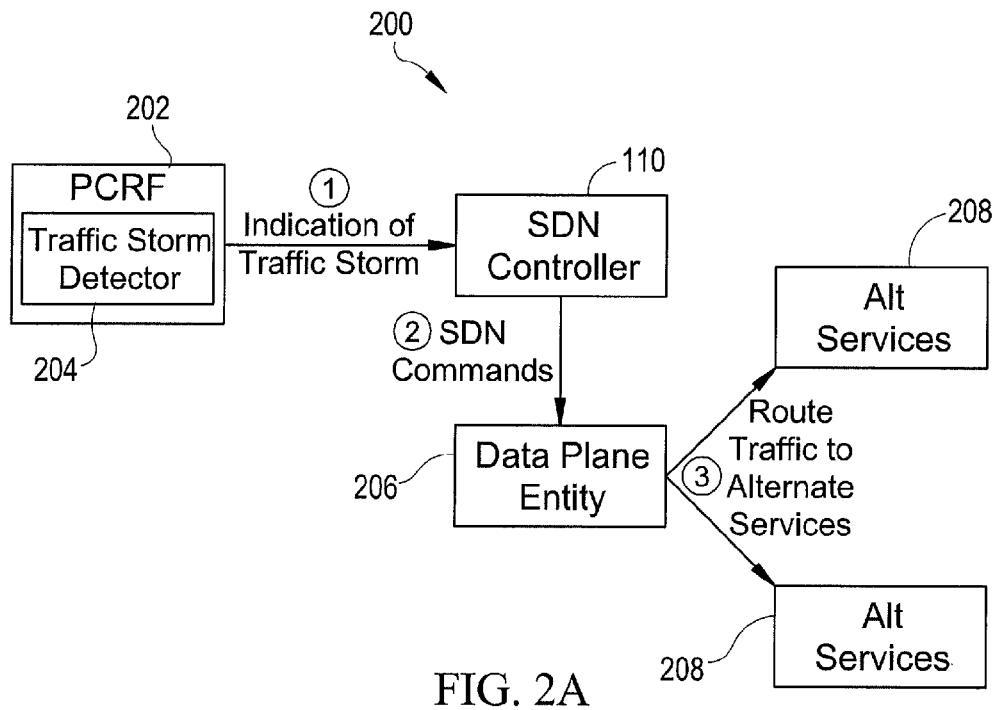

FIG. 2A illustrates another example of mitigation of traffic storms in a network 200. In FIG. 2A, a policy and charging rules function (PCRF) 202 detects an indication of a traffic storm and communicates the indication to SDN controller 110. PCRF 202 may include a traffic storm detector 204 configured to detect an indication of a traffic storm based upon policy requests or other data received from network entities, such as gateways, application servers, etc. In response to detecting the indication of a traffic storm, PCRF 202 may communicate the indication to SDN controller 110.

Figure 2B:
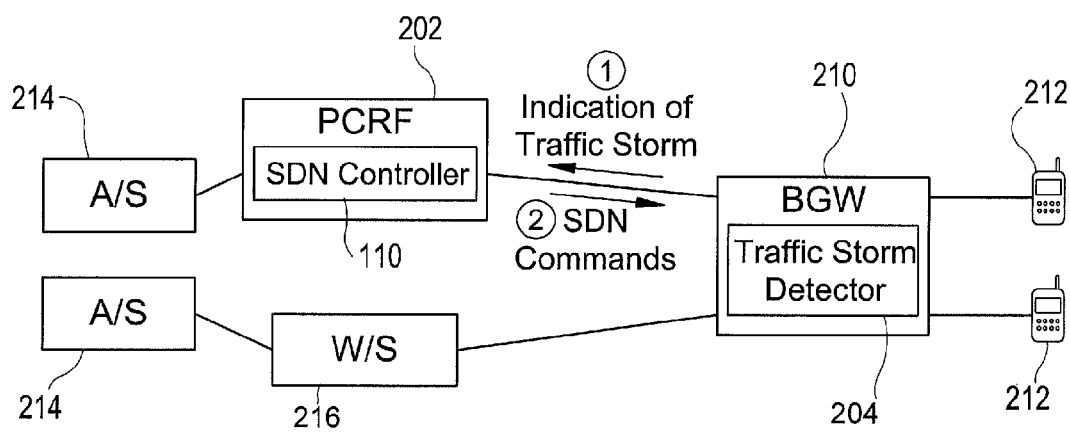

SDN controller 110 may include a standalone node, or it may be integrated within one or other nodes, such as PCRF 202 (e.g., FIG. 2B). In response to detection of the indication of the traffic storm, SDN controller 110 sends SDN commands to one or more network entities, such as a controllable data plane entity 206. Data plane entity 206 may include a controllable entity adapted to mitigate the detected traffic storm by routing traffic to other alternate resources. In some embodiments, data plane entity 206 may include a switch, a router, or other node configured for handling network traffic. In one exemplary embodiment, SDN controller 110 may include an OpenFlow controller and the SDN commands may be OpenFlow commands for instructing data plane entity 206 to route traffic to alternate services 208. For example, if the traffic storm indicates an unusually high volume of call attempts, the automated voice response servers instruct the callers to retry calls again at a later time.

FIG. 2B illustrates another embodiment of a network or system for detecting and mitigating traffic storms according to aspects of the subject matter described herein. Referring to FIG. 2B, network traffic storm detector 204 may include a standalone node and/or a node integrated within an ingress node, such as a border gateway (BGW) node 210. In the illustrated example, traffic storm detector 204 is configured to detect an indication of a traffic storm caused by a burst or flurry of user equipment 212 (e.g., "UE" devices such as IP phones, computers, tablets, etc.) attempting to BGW 210 may be configured to communicate an indication of the traffic storm to PCRF 202. SDN controller 110, which in this example may be integrated within PCRF 202, may issue SDN commands to BGW 210 for dynamically routing traffic to alternate services provided by one or more application servers (A/S) 214.

Figure 3:
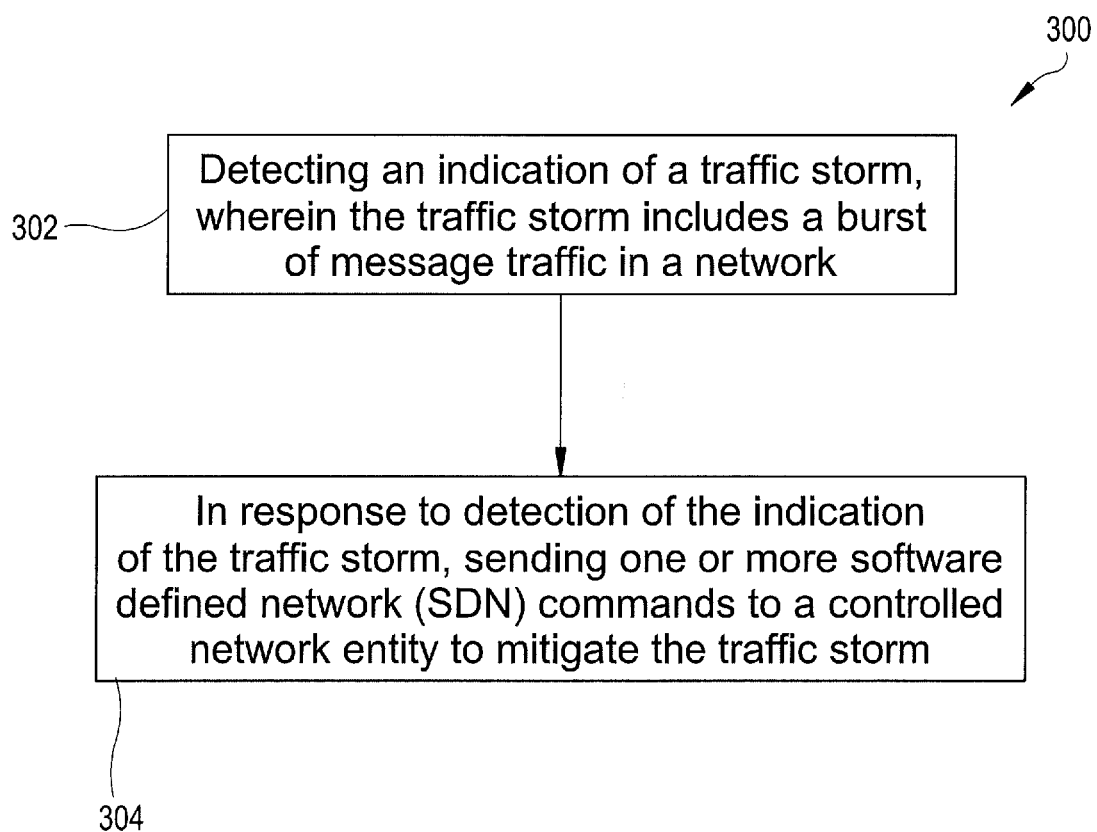
FIG. 3 is a flow chart illustrating an exemplary process for mitigating traffic storms according to an embodiment of the subject matter described herein.

FIG. 3 is a flow chart illustrating an exemplary process for mitigating traffic storms according to an embodiment of the subject matter described herein. In block 302, an indication of a traffic storm can be detected. The indication may include a flurry or burst of message traffic in a network. A traffic storm detector may include a standalone node, or it may be integrated with another node (e.g., a PCRF, an ingress node, and/or an SDN controller) for detecting the sudden burst of message traffic.

In block 304, in response to detecting the indication of the traffic storm, one or more SDN commands can be communicated to a controllable network entity for mitigating the traffic storm. The controllable network entity may include a controlled switch, gateway, or addressable data plane entity configured to reroute traffic according to the SDN commands.

While the methods, systems, and computer readable media have been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims. It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for mitigating traffic storms, the method comprising:
   providing a traffic storm detector at a controlled network entity associated with a first network, wherein the controlled network entity is configured to route message traffic to a first node in the first network;
   detecting, at the traffic storm detector, an indication of a traffic storm, wherein the traffic storm includes a burst of message traffic directed towards the controlled network entity;
   communicating the indication of the traffic storm to a separate controller that is remotely located with respect to the traffic storm detector;
   in response to receiving the indication of the traffic storm at the controller, sending, by the controller, one or more software defined network (SDN) commands to the controlled network entity to mitigate the traffic storm; and
   in response to receiving the one or more SDN commands at the controlled network entity, routing some of the message traffic to the first node in the first network and dynamically re-routing at least some of the message traffic to a second node in a second network.

2. The method of claim 1, wherein the controlled network entity comprises a switch, a gateway, a registration node, or an addressable data plane entity configured to reroute traffic according to the one or more SDN commands.

3. The method of claim 1, wherein the controller comprises an OpenFlow controller and wherein the controlled network entity comprises an OpenFlow compatible switch.

4. The method of claim 1, wherein the controller includes is a stand-alone node.

5. The method of claim 1, wherein the controller is integrated within a policy and charging rules function (PCRF).

6. The method of claim 1, wherein the one or more SDN commands instruct the controlled network entity to dynamically establish a switching path to the second node to mitigate the traffic storm.

7. The method of claim 1, wherein the second node is an access node associated with the second network or a service node.

8. The method of claim 1, wherein the second network is a virtual network that is dynamically created and implemented to receive packets.

9. The method of claim 1, wherein the second network is a pre-existing network offered by an alternate carrier.

10. The method of claim 1, wherein the one or more SDN commands partition traffic between the first node in the first network and the second node in the second network based upon a class of traffic, an emergency indicator, a destination, an address, an IP prefix, an IP address, one or more QoS rules, or one or more policy rules.

11. The method of claim 1, wherein the traffic storm includes registration traffic following a service outage.

12. A system for mitigating traffic storms, the system comprising:
- a traffic storm detector disposed at a controlled network entity for detecting an indication of a traffic storm, wherein the traffic storm comprises a burst of message traffic directed towards the controlled network entity, and wherein the controlled network entity is configured to route message traffic to a first node in a first network; and
- a software defined network (SDN) controller configured to receive a communication from the traffic storm detector regarding the indication of the traffic storm, wherein the SDN controller is remotely located with respect to the traffic storm detector, and wherein the SDN controller is configured to generate and send SDN commands to the controlled network entity to mitigate the traffic storm;
- wherein, in response to receiving the one or more SDN commands at the controlled network entity, the controlled network entity is configured to route some of the message traffic to the first node in the first network and dynamically re-route at least some of the message traffic to a second node in a second network.

13. The system of claim 12, wherein the controlled network entity comprises an OpenFlow compatible switch, a gateway, a registration node, or an addressable data plane entity.

14. The system of claim 12, wherein the SDN controller is a stand-alone node.

15. The system of claim 12, wherein the SDN controller is integrated with a policy and charging rules function (PCRF).

16. The system of claim 12 wherein the SDN commands instruct the controlled network entity to dynamically establish a switching path to the second node to mitigate the traffic storm.

17. The system of claim 12, wherein the second node is an access node associated with the second network or a service node.

18. The system of claim 12, wherein the second network is a virtual network that is dynamically created and implemented to receive packets.

19. The system of claim 12, wherein the second network is a pre-existing network offered by an alternate carrier.

20. The system of claim 12, wherein the SDN commands partition traffic between the first node in the first network and the second node in the second network according to a class of traffic, an emergency indicator, a destination, an address, an IP prefix, an IP address, one or more QoS rules, or one or more policy rules.

21. The system of claim 12, wherein the traffic storm includes registration traffic following a service outage.

22. A non-transitory computer readable medium having stored thereon computer executable instructions embodied in a computer readable medium and when executed by a processor of a computer performs steps comprising:
- detecting an indication of a traffic storm via a traffic storm detector provided at a controlled network entity, wherein the controlled network entity is configured to route message traffic to a first node in a first network, and wherein the traffic storm includes a burst of message traffic in the first network directed towards the controlled network entity;
- communicating the indication of the traffic storm to a separate controller that is remotely located with respect to the traffic storm detector;
- in response to receiving the indication of the traffic storm at the controller, sending, by the controller, one or more software defined network (SDN) commands to the controlled network entity to mitigate the traffic storm; and
- in response to receiving the one or more SDN commands at the controlled network entity, routing some of the message traffic to the first node in the first network and dynamically re-routing at least some of the message traffic to a second node in a second network.

* * * * *